United States Patent
Bonetti

[11] Patent Number: 5,836,649
[45] Date of Patent: Nov. 17, 1998

[54] SAFETY CHAIR FOR CHILDREN

[75] Inventor: Lućiano Bonetti, Telgate, Italy

[73] Assignee: Foppa Pedretti S.p.A., Grumello del Monte, Italy

[21] Appl. No.: 840,371

[22] Filed: Apr. 29, 1997

[51] Int. Cl.[6] .................. A47D 1/10; B60N 2/28
[52] U.S. Cl. .................. 297/256.1; 297/256.13
[58] Field of Search ................ 297/256.1, 255, 297/256.13, 250.1

[56] References Cited

U.S. PATENT DOCUMENTS

| | | | |
|---|---|---|---|
| Re. 29,841 | 11/1978 | Wener | 297/256.13 |
| 3,572,827 | 3/1971 | Merelis et al. | 297/256.13 X |
| 3,948,556 | 4/1976 | Hyde et al. | 297/256.13 |
| 3,992,056 | 11/1976 | Koziatek et al. | 297/256.13 |
| 4,033,622 | 7/1977 | Boudreau | 297/256.13 |
| 4,047,755 | 9/1977 | McDonald et al. | 297/256.13 X |
| 4,186,962 | 2/1980 | Meeker | 297/256.13 |
| 4,231,612 | 11/1980 | Meeker | 297/256.13 |
| 4,343,510 | 8/1982 | Cone | 297/256.13 |
| 4,718,715 | 1/1988 | Ho | 297/256.13 X |
| 5,609,393 | 3/1997 | Meeker et al. | 297/256.13 |

*Primary Examiner*—Peter M. Cuomo
*Assistant Examiner*—Rodney B. White
*Attorney, Agent, or Firm*—McGlew and Tuttle

[57] ABSTRACT

The safety chair for a child includes a base frame (11) functions as a support for the seat of the chair. A frame (12) supports the back of the chair. An oblique frame (13) connects the front of the base frame (11) to the frame (12) of the back and an auxiliary frame (14) for fastening and unfastening to the base frame (11) to achieve use and non-use positions, in which the chair is folded for easy transport. A crutch frame (15) is joined to the underside of the base frame for propping or providing an additional inclination to the safety chair.

8 Claims, 4 Drawing Sheets

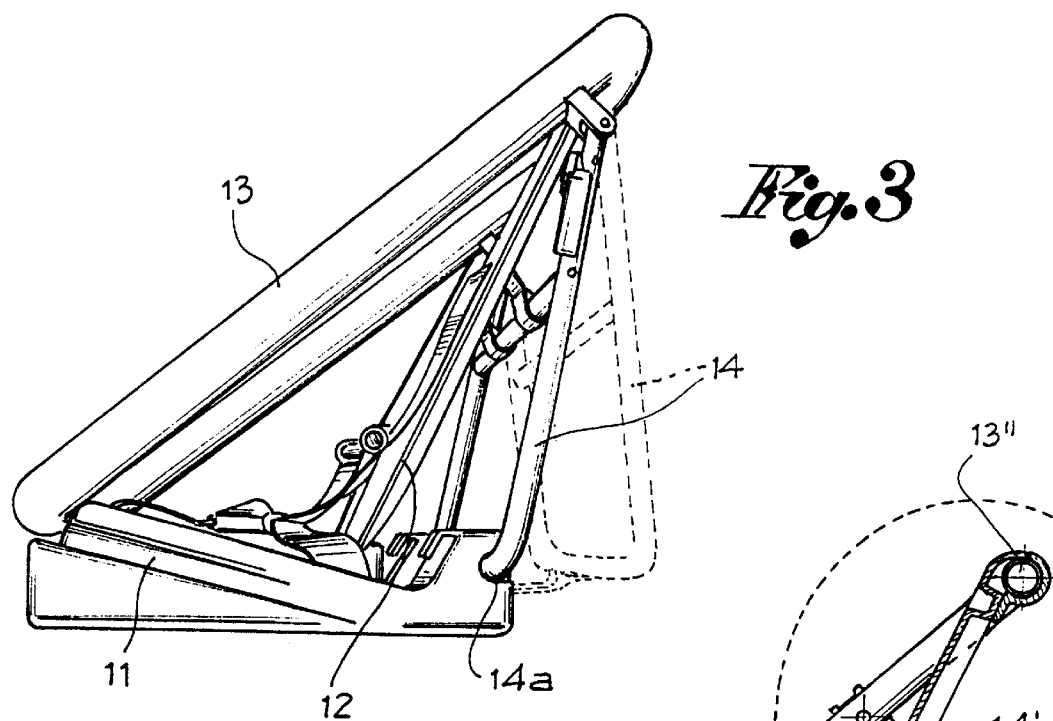
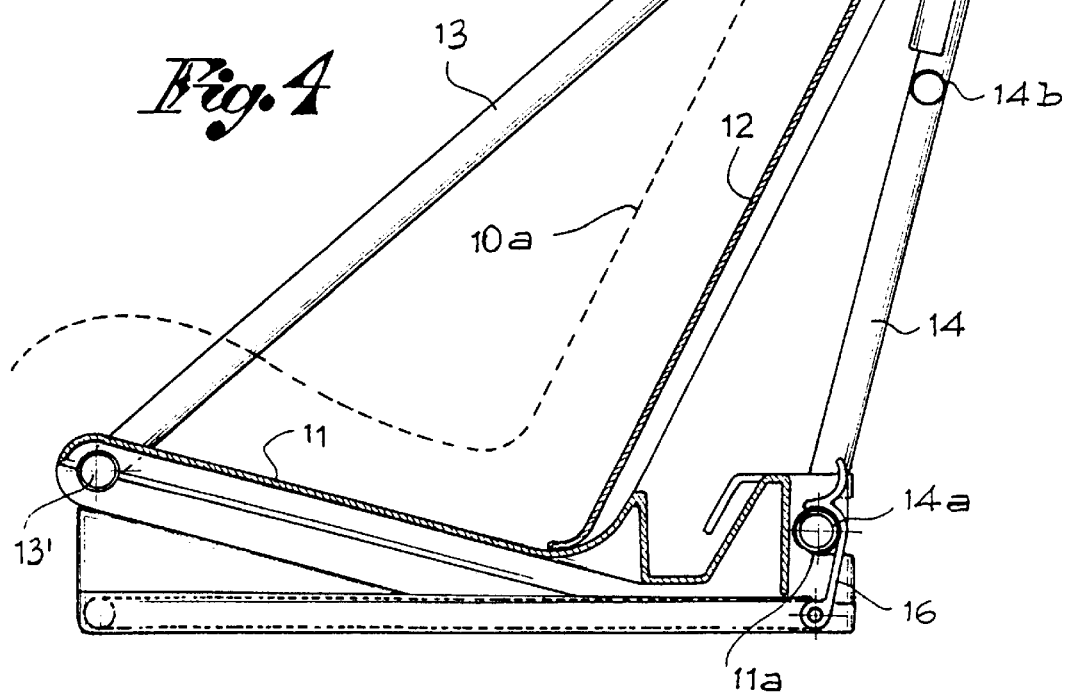

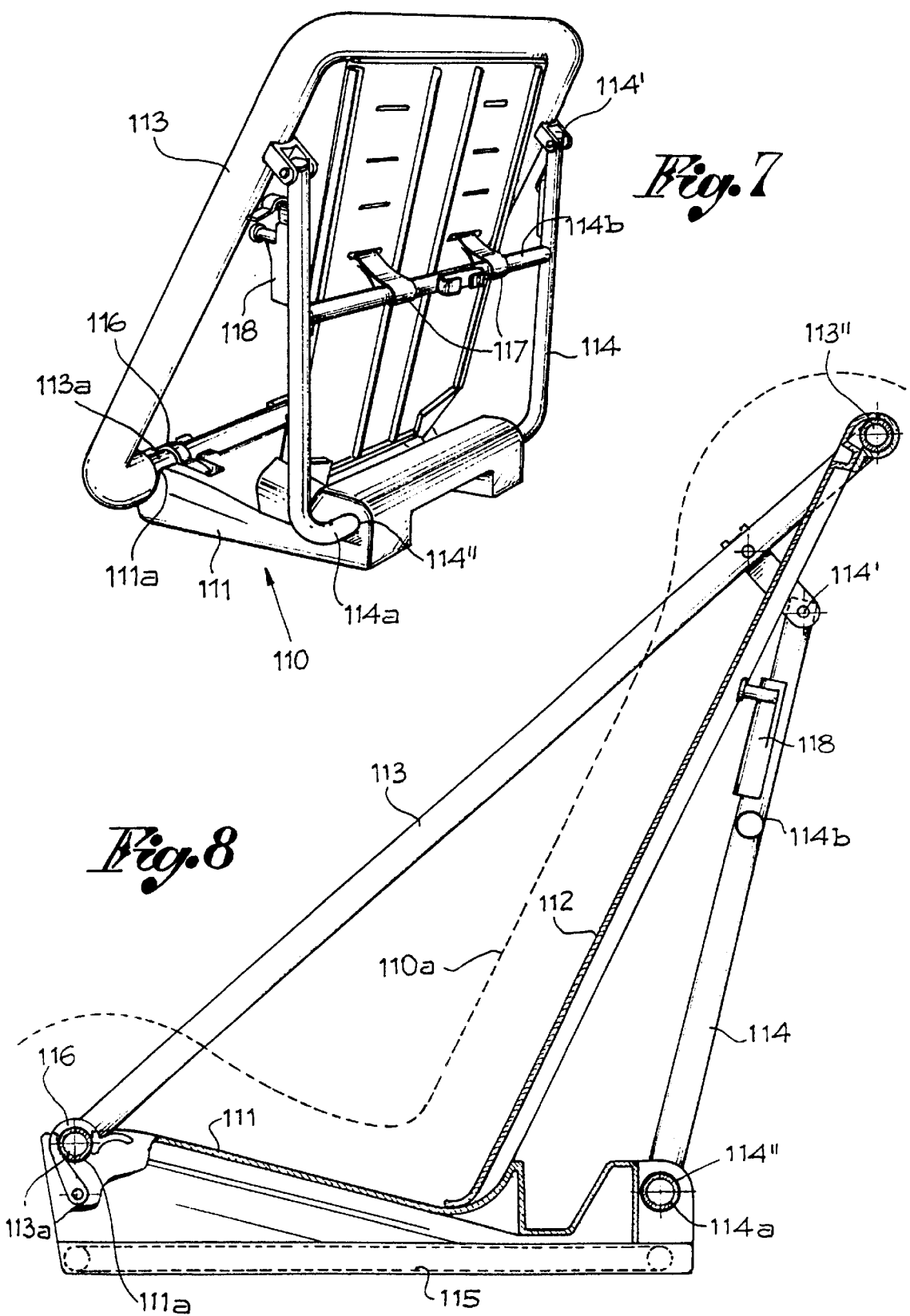

SAFETY CHAIR FOR CHILDREN

The present invention concerns safety chairs for children, and more particularly it pertains to chairs designed to be applied to a seat in a vehicle, either front ahead or front back.

BACKGROUND OF THE INVENTION

Chairs for children have already been proposed in various forms with rigid frame as well as with folding frame, the latter in order to make a chair more compact when it is transported or replaced after use.

SUMMARY AND OBJECTS OF THE INVENTION

The chair according to the present invention is of folding type and advantageously realized with a new, original combination of elements which permits to results in an embodiment which is relatively simple and economical but also extremely reliable, and allows for easy positioning for use and folding thereof after use.

The chair according to the present invention will be described more in detail with reference to accompanying, indicative and non-limitative drawings, in which:

BRIEF DESCRIPTION OF THE DRAWINGS

FIG. 3 shows a side view of the chair in FIG. 1 and, in section line, the chair in unfastened condition ready for folding;

FIG. 4 shows a median vertical sectional view of the chair;

FIG. 7 shows a perspective view of the chair from the back, according to a construction variant applying to the folding joint and frame fastening; and FIG. 8 shows a side sectional view of the chair modified as illustrated in FIG. 7.

DESCRIPTION OF THE PREFERRED EMBODIMENTS

Figure 1:
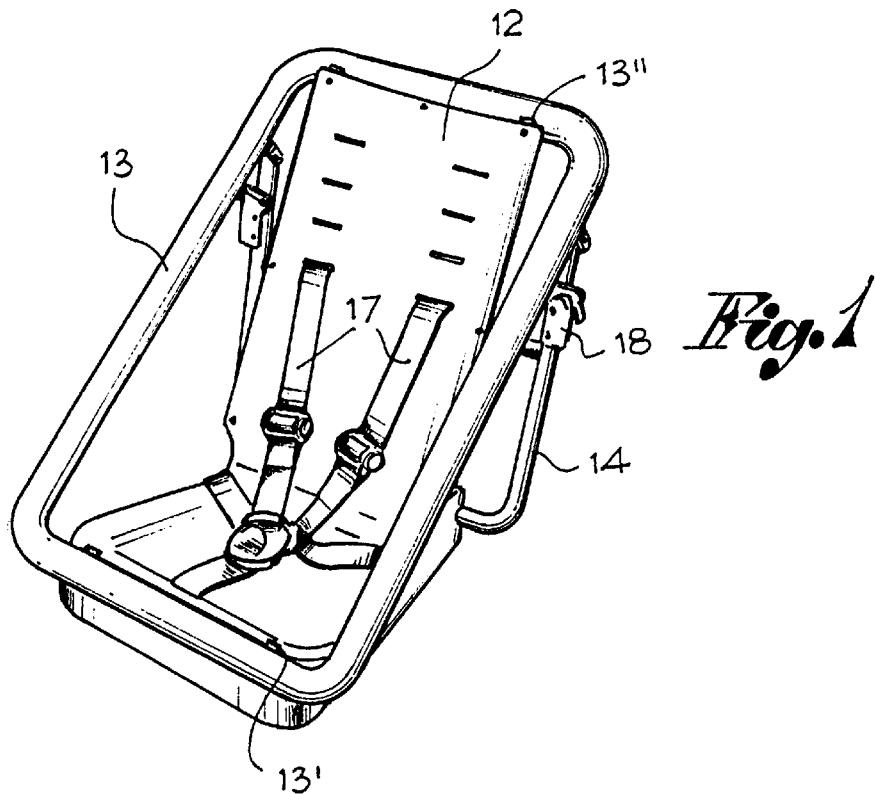
FIG. 1 shows a perspective view from the front of the chair ready for use.
Figure 2:
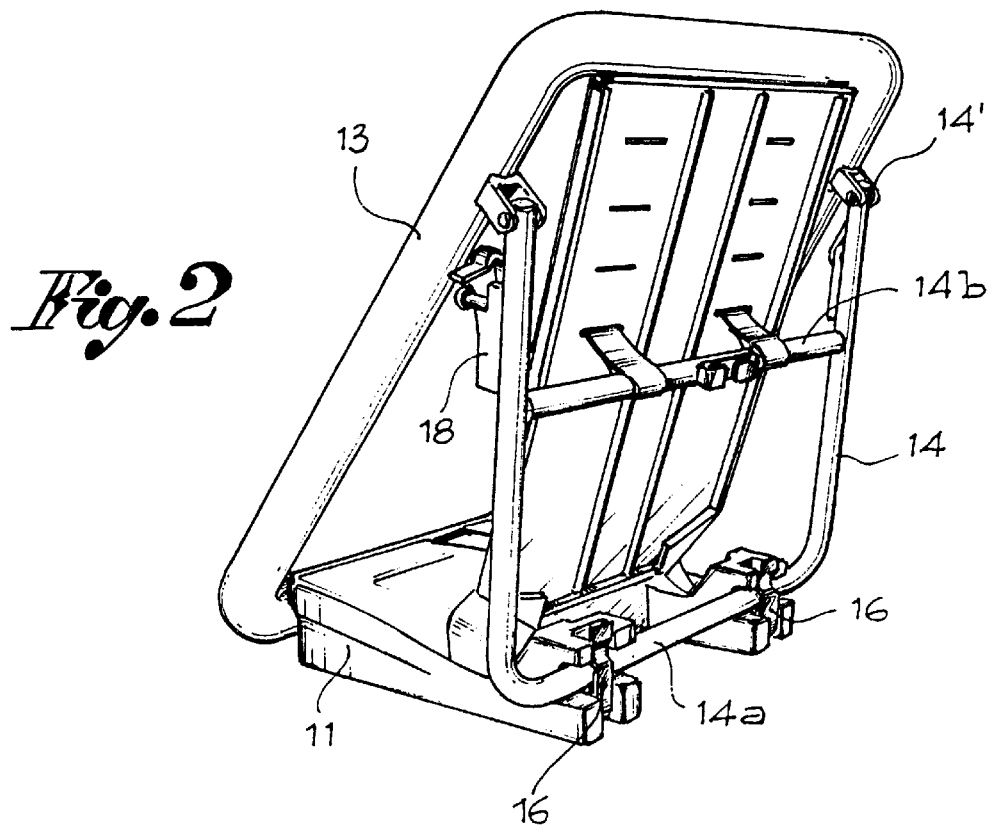
FIG. 2 shows a perspective view from the back of the chair, again ready for use

The chair illustrated herein shows a supporting structure 10 designed to be provided with a body or upholstering 10a which will receive the child sitting therein.

Such structure comprises: a base frame or plane (base support) 11 functioning as a support for the seat of the chair; a frame or plane 12 supporting the back of the chair; an oblique frame 13 which connects the front of the base frame or plane 11 to the frame or plane 12 of the back; and an auxiliary frame 14 for fastening/unfastening. Under the base frame or plane 11 a crutch-frame 15 is jointed as described below.

According to a first embodiment as shown in FIGS. 1 to 6, the oblique frame 13, which may be upholstered, is jointed, at 13', to the front of the base frame or plane 11 and at 13" to the top of the plane or frame 12 of the back. Such frame 12 is therefore connected to the oblique frame 13, but it is free at its lower part and slidingly rests on the base frame or plane 11.

The frame 14 for fastening/unfastening is substantially U-shaped, with the ends of its parallel arms jointed, at 14', to the sides of the oblique frame and with its lower cross-piece 14a introduced in holes 11a provided in the back of the base frame or plane 11 and blocked in such holes by means of fasteners 16.

At an intermediate level on the auxiliary frame 14, a smaller cross-piece 14b is fixed, which is connected to safety belts 17 for the child sitting on the chair.

On the parallel arms of the auxiliary frame 14, fasteners or loops 18 are provided for the safety belt of the vehicle, which shall hold the chair on a seat of the vehicle.

In practice, the chair is positioned ready for use when the frame 12 of the back (back support) is upright above the base frame or plane 11 and the lower cross-piece of the auxiliary frame is fastened in the holes 11a provided at the back of the base frame or plane 11 as shown in FIGS. 1 to 4.

Figure 5:
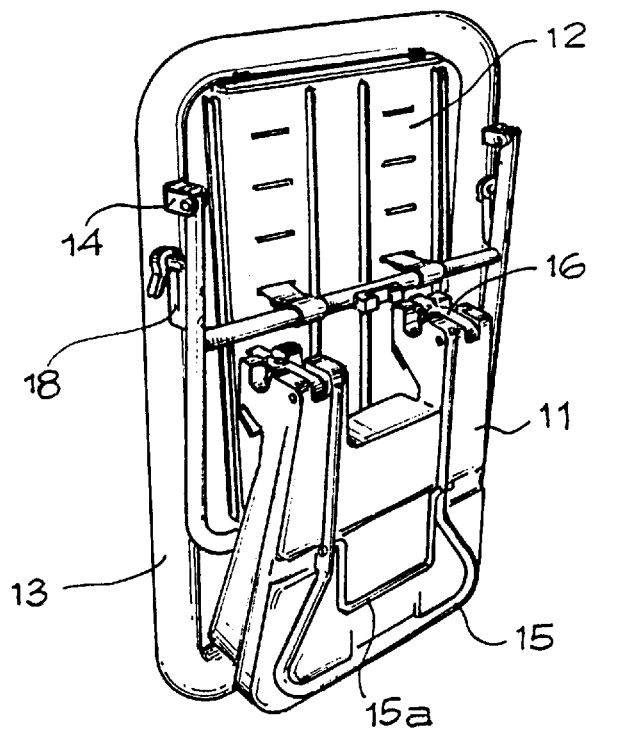
FIG. 5 shows the chair folded.

The chair may be folded by simply unfastening the lower cross-piece 14a, bringing it to the back of the back frame and turning the back over backwards, along with the oblique frame 13, so as to arrange it in line with the base plane, as shown in FIG. 5. In this way the chair becomes flat in order to make it more compact during transport or when replacing it.

Figure 6:
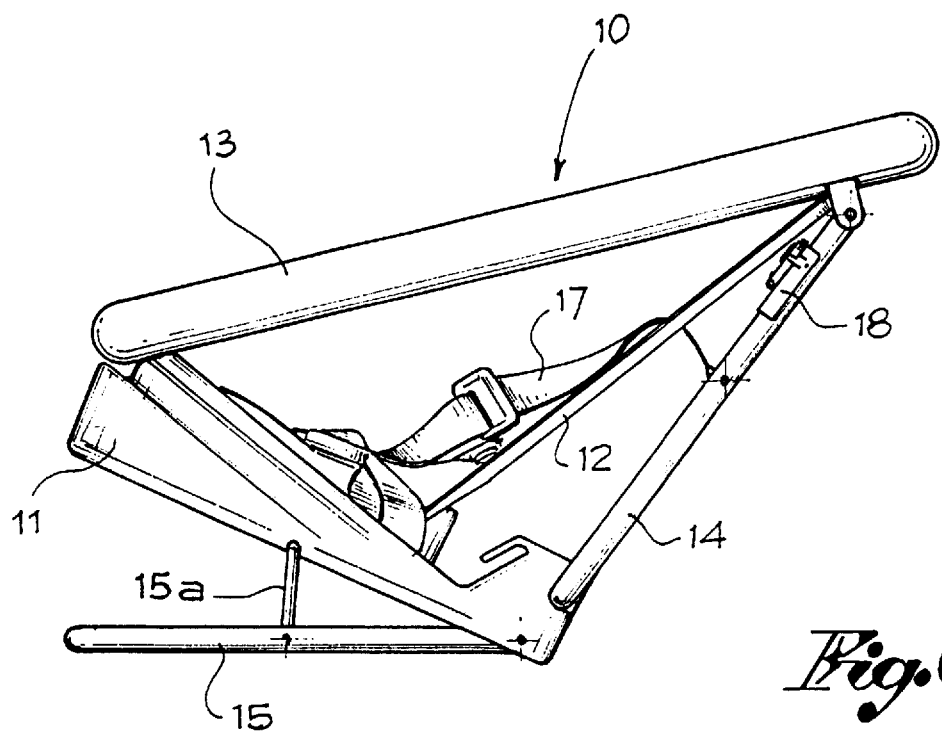
FIG. 6 shows the chair ready for use, with a base crutch

Moreover, when the chair is positioned ready for use, it may also rest on the crutch 15. Such crutch is pivoted to the base frame or plane 11, preferably with the same pins as the fasteners 16 which block the auxiliary frame 14. When the crutch 15 is not used, it is folded and concealed on the base—see FIG. 5; when it is used, it is positioned oblique and leant to the base by means of a prop 15a as shown in FIG. 6.

According to a further, equivalent, embodiment as shown in FIGS. 7 and 8, the chair structure still comprises a base frame or plane 111 functioning as a support for the chair seat, a plane or frame 112 supporting the back of the chair, an oblique frame 113 which connects the front of the base frame or plane 111 to the plane or frame 112 of the back, and a back frame 114. A crutch-frame 115 is jointed below the base frame or plane 11.

In this embodiment however, the oblique frame 113 comprises a lower cross-piece 113a which is arranged in holes 111a provided in the front of the base frame or plane 111 and is blocked in said holes through fasteners 116.

At the top, said oblique frame 113 is jointed, at 113", to the top of the plane or frame 112 of the back. Said frame 112 is therefore connected to the oblique frame 113 but it is free at its lowest part and slidingly rests on the base frame or plane 11 as in the first embodiment.

The back frame 114, substantially U-shaped, has its parallel arms jointed to the sides of the oblique frame, at 114', and its lower cross-piece 114a rotably jointed, though immovable, to the base frame or plane, at 114".

For the rest, the chair in FIGS. 7 and 8 is similar to the chair in FIGS. 1 to 6.

This chair is positioned ready for use when the frame 112 of the back is in upright position above the base frame or plane 111 and the lower cross-piece 113a of the oblique frame 113 is introduced in the holes 11a provided in the front of the base frame or plane 111.

The chair may be folded by simply unfastening the cross-piece 113a of the oblique frame 113 from the base 111 and turning the frame over backwards, along with the support of the back 112 and with the back frame 114, which will therefore rotate on the cross-piece 114a.

I claim:

1. A safety chair for children designed to be applied to a seat in a vehicle, the safety chair comprising:

an upholstered supporting structure including a seat and a base support, supporting said seat;

a back and a back support which extends from said base support for supporting said back;

an oblique frame which connects a front of said base support to a top of said back support; and an auxiliary frame which connects said oblique frame to a back of said base support, said auxiliary frame being designed to be fastened to said base support so as to maintain said back support upright when the chair is positioned ready for use and being unfastenable to permit overturning of the back support substantially in line with the base support, said oblique frame being jointed to a front of said base support and may be overturned thereon, wherein said back support is pivoted, at said top, on said oblique frame whereas a lower part of said back support is free and slides on said base support and wherein said auxiliary frame is pivoted on said oblique frame and removably fastened in holes provided in said back of said base support.

2. A chair according to claim 1, also comprising means for connection of safety belts.

3. A safety chair for children designed to be applied to a seat in a vehicle, the safety chair comprising:

an upholstered supporting structure including a seat and a base support, supporting said seat;

a back and a back support which extends from said base support for supporting said back;

an oblique frame which connects a front of said base support to a top of said back support; and an auxiliary frame which connects said oblique frame to a back of said base support, said auxiliary frame being designed to be fastened to said base support so as to maintain said back support upright when the chair is positioned ready for use and being unfastenable to permit overturning of the back support substantially in line with the base support, said oblique frame comprising a lower cross-piece designed to be arranged and removably fastened in holes provided in a front of said base support and may be overturned backwards when said cross-piece is unfastened, wherein said back support is pivoted at said top, on said oblique frame and comprises a lower part which is free and slides on said base support, and wherein said back support is pivoted, at the top, to the oblique frame and inseparably jointed at the back of said base support.

4. A chair according to claim 3, also comprising means for connection of safety belts.

5. A safety chair for children designed to be applied to a seat in a vehicle, the safety chair comprising:

an upholstered supporting structure including a seat and a base support, supporting said seat;

a back and a back support which extends from said base support for supporting said back;

an oblique frame which connects a front of said base support to a top of said back support;

an auxiliary frame which connects said oblique frame to a back of said base support, at least one of said oblique frame and said auxiliary frame being designed to be fastened to said base support so as to maintain said back support upright when the chair is positioned ready for use and being unfastenable to permit overturning of the back support substantially in line with the base support; and a supporting crutch positioned and overturnable under said base support.

6. A chair according to claim 5, also comprising means for connection of safety belts.

7. A safety chair for children designed to be applied to a seat in a vehicle, the safety chair comprising:

an upholstered supporting structure including a seat and a base support, supporting said seat;

a back and a back support which extends from said base support for supporting said back;

an oblique frame which connects a front of said base support to a top of said back support;

an auxiliary frame which connects said oblique frame to a back of said base support, said auxiliary frame being designed to be fastened to said base support so as to maintain said back support upright when the chair is positioned ready for use and being unfastenable to permit overturning of the back support substantially in line with the base support; and a supporting crutch positioned and overturnable under said base support.

8. A chair according to claim 7, also comprising means for connection of safety belts.

* * * * *